(12) United States Patent
Schnabel, Jr.

(10) Patent No.: US 6,279,349 B1
(45) Date of Patent: Aug. 28, 2001

(54) METHOD FOR MAKING GLASS SHEET HEATING FURNACE

(75) Inventor: James P. Schnabel, Jr., Holland, OH (US)

(73) Assignee: Glasstech, Inc., Perrysburg, OH (US)

( * ) Notice: Subject to any disclaimer, the term of this patent is extended or adjusted under 35 U.S.C. 154(b) by 0 days.

(21) Appl. No.: 09/479,472

(22) Filed: Jan. 10, 2000

Related U.S. Application Data

(62) Division of application No. 09/217,500, filed on Dec. 21, 1998, now Pat. No. 6,131,411.

(51) Int. Cl.[7] .................................................. C03B 29/00
(52) U.S. Cl. ............................... 65/111; 65/118; 65/119; 65/273; 65/356; 65/355; 219/388; 219/476; 432/94; 432/128; 432/130; 432/133; 432/136; 432/159
(58) Field of Search ............................... 65/111, 118, 117, 65/119, 120, 269, 273, 355, 356, DIG. 4; 219/388, 476; 392/307, 310, 417; 432/94, 128, 130, 133, 136, 159

(56) References Cited

U.S. PATENT DOCUMENTS

| | | |
|---|---|---|
| 3,934,970 | 1/1976 | McMaster et al. . |
| 3,947,242 | 3/1976 | McMaster et al. . |
| 3,994,711 | 11/1976 | McMaster . |
| 4,505,671 * | 3/1985 | McMaster . |
| 4,529,380 * | 7/1985 | McMaster . |
| 4,973,349 * | 11/1990 | Pernelle et al. . |
| 4,983,202 * | 1/1991 | Deb et al. . |
| 5,028,250 * | 7/1991 | Deb et al. . |
| 5,176,733 * | 1/1993 | Koss . |
| 5,302,178 * | 4/1994 | Severi . |
| 5,609,785 * | 3/1997 | Sallinen et al. . |
| 5,669,954 * | 9/1997 | Kormanyos . |
| 5,672,191 | 9/1997 | Kormanyos . |
| 5,735,924 | 4/1998 | Kormanyos . |
| 5,762,677 | 6/1998 | Kormanyos . |
| 5,792,232 | 8/1998 | Kormanyos . |
| 5,915,958 * | 6/1999 | Kurie . |
| 5,951,734 * | 9/1999 | Friedel et al. . |

OTHER PUBLICATIONS

Glafurit, Radiation high convection combi–furnace for GVG–Bietigheim, Glass–Technology International, Jan. 1998, pp. 114–118, Glafurit—Germany.

* cited by examiner

*Primary Examiner*—Michael P. Colaianni
(74) *Attorney, Agent, or Firm*—Brooks & Kushman P.C.

(57) ABSTRACT

A method for making a furnace for heating a glass sheet by lower electric resistance elements (50) supported by a furnace housing (12) below a roll conveyor (40) and by supplying a gas burner heated hot gas flow from a forced convection heater (56) that provides a dominant mode of external heat for heating the conveyed glass sheet from above. The furnace is manufactured by retrofitting an electric resistance heater type glass sheet furnace that initially has both lower and upper electric resistance elements (50) located below and above the roller conveyor (40). The lower electric resistance elements (50) are maintained while the upper electric resistance elements (50) are replaced with a gas burner forced convection heater (56).

6 Claims, 6 Drawing Sheets

METHOD FOR MAKING GLASS SHEET HEATING FURNACE

This application is a division of U.S. application Ser. No. 09/217,500 filed Dec. 21, 1998, now U.S. Pat. No. 6,131,411.

TECHNICAL FIELD

This invention relates to a method for heating glass sheets, a furnace for heating glass sheets, and a method for making the furnace that heats the glass sheets.

BACKGROUND ART

Glass sheets are heated for processing such as forming, heat strengthening, or tempering, etc. Such heating is conventionally performed by either electric resistance-type furnaces or by forced convection furnaces. Prior electric resistance-type furnaces are disclosed by U.S. Pat. Nos. 3,934,970 McMaster et al., 3,947,242 McMaster et al., and 3,994,711 McMaster, all of which have lower and upper housing portions that support electric resistance elements that provide radiant heating of glass sheets from below and above at their lower and upper surfaces during conveyance within a heating chamber of the furnace housing. Prior forced convection furnaces are disclosed by the U.S. Pat. Nos. of Kenneth R. Kormanyos: 5,669,954; 5,672,191; 5,735,924; 5,762,677; and 5,792,232, all of which have lower and upper forced convection heaters that provide forced convection heating of conveyed glass sheets from below and above at top and bottom surfaces of the glass sheets.

Electric resistance furnaces for heating glass sheets are less expensive to initially manufacture than forced convection furnaces for heating glass sheets and also can be more easily controlled by less involved control apparatus. In addition, electric resistance furnaces for heating glass sheets also result in a greater percentage of the energy input being transferred into the glass for the heating. However, electrical energy is more expensive than natural gas heating and the radiant heating involved cannot efficiently heat low emission-coated glass. Furthermore, radiant heating cannot uniformly heat glass coated partially with paint bands or reflective coatings used in the automotive industry because the coated area absorb more or less radiant heat than adjacent uncoated areas.

Forced convection furnaces for heating glass sheets are not as efficient as electric resistance furnaces since a certain volume of heated air must be continually removed from the furnace to make up for the volume of combusted gas that is being introduced. However, this loss in efficiency is offset by the lower cost of natural gas as compared to electrical energy such that the operational cost for forced convection furnaces are effectively less than for electric resistance furnaces.

DISCLOSURE OF INVENTION

One object of the present invention is to provide an improved method for heating a glass sheet.

An object of the present invention is to provide an improved method for making a furnace for heating glass sheets.

In carrying out the above object, the method for making a furnace for heating glass sheets in accordance with the invention is performed by providing a glass sheet roll conveyor furnace of the electric resistance heater type having a housing including lower and upper portions for respectively supporting lower and upper electric resistance elements below and above a roll conveyor including conveyor rolls within the furnace. In making the furnace, the roll conveyor and the lower housing portion of the furnace are maintained for supporting the lower electric resistance elements below the conveyor rolls such that electrical power supplied thereto provides heating from below of the glass sheets conveyed by the conveyor rolls. The upper housing portion of the furnace above the roll conveyor is removed. The furnace manufacturing also involves installing another upper housing portion and a gas burner forced convection heater supported thereon above the roll conveyor to provide a dominant mode of external heat for heating the conveyed glass sheets from above.

The preferred practice for making the furnace is also performed by installing the gas burner forced convection heater with hot gas distributors spaced along a direction of conveyance of the furnace. This installation of the forced convection heater is performed with a gas burner on one lateral side of the furnace, with a mixing tube that mixes return air and products of combustion, and with a plenum housing that is located at another lateral side of the furnace to receive the mixed return air and products of combustion from the mixing tube as a hot gas flow that is fed to the hot gas distributors. The preferred installation of the forced convection heater is also performed with the plenum housing having an intake that receives the mixed return air and products of combustion at one lateral side of the plenum housing, and with the plenum housing having a supply blower located therein at another lateral extremity of the plenum housing to provide pressurizing of the mixed return air and products of combustion as the hot gas flow.

The objects, features, and advantages of the present invention are readily apparent from the following detailed description of the best mode for carrying out the invention when taken in connection with the accompanying drawings.

BEST MODE FOR CARRYING OUT THE INVENTION

Figure 1:
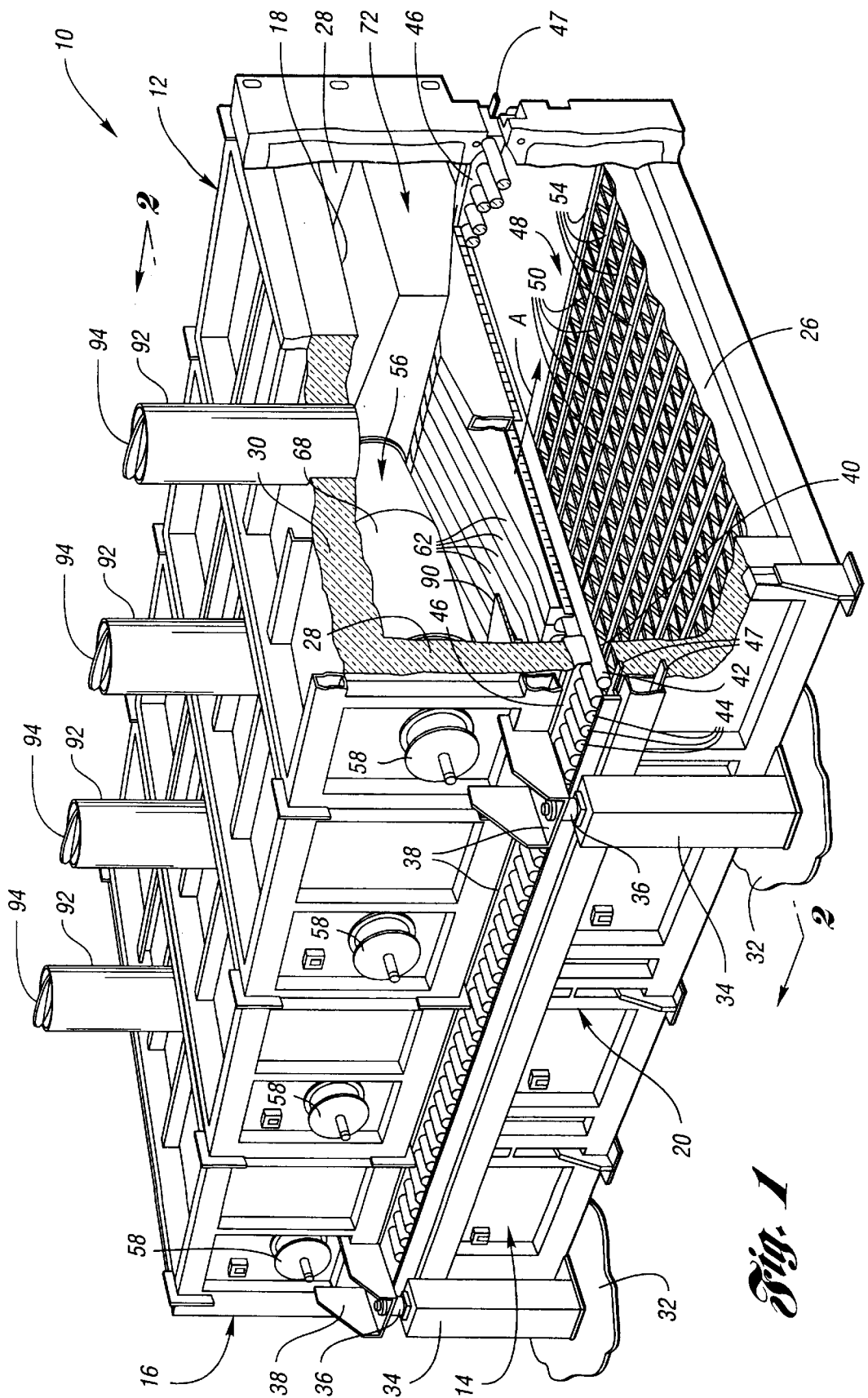
FIG. 1 is a partially broken away perspective view of a furnace constructed in accordance with the invention to perform the method thereof for heating glass sheets.

With reference to FIG. 1 of the drawings, a furnace for heating glass sheets in accordance with the invention is generally indicated by 10 and is operable to perform a glass sheet heating method as is hereinafter more fully described. Both the furnace and the method for heating glass sheets will be described in an integrated manner.

Figure 2:
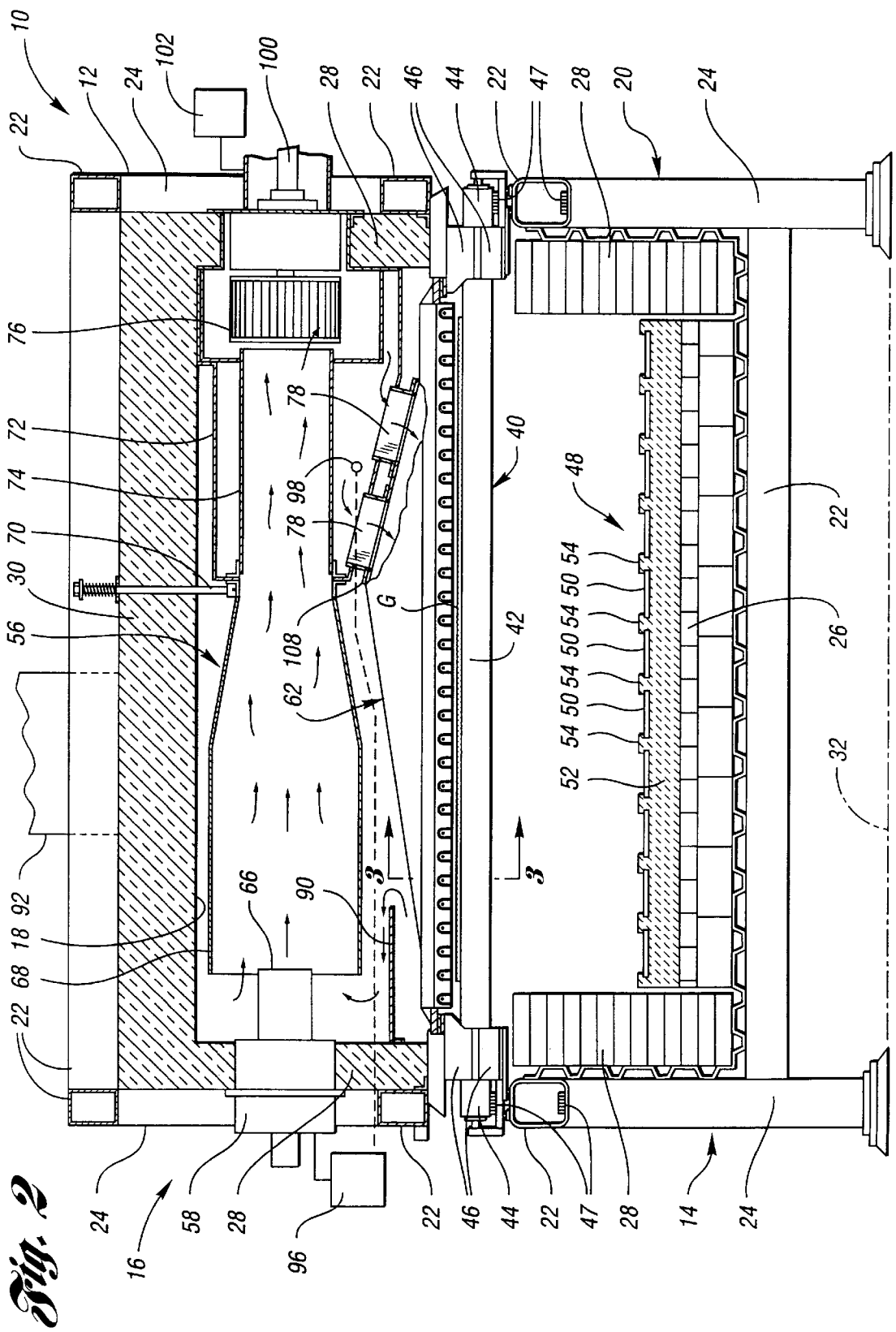
FIG. 2 is a cross sectional view of the furnace taken along the direction of line 2—2 in FIG. 1 to illustrate its construction.

With continuing reference to FIG. 1 and additional reference to FIG. 2, the furnace 10 includes a housing 12 having lower and upper housing portions 14 and 16 that cooperate to define a heating chamber 18 in which glass sheets are heated as is hereinafter more fully described. Furnace housing 12 includes a framework 20 having horizontal beams 22 and vertical posts 24 which as shown in FIG. 2 support an insulated floor 26, insulated side walls 28, and an insulated ceiling 30. As illustrated in FIG. 1, the factory floor 32 also supports the lower ends of vertical posts 34 whose upper ends have mounts 36 that support outwardly extending arms 38 of the upper housing portion 16 to provide support thereof over the lower housing portion 14.

Figure 3:
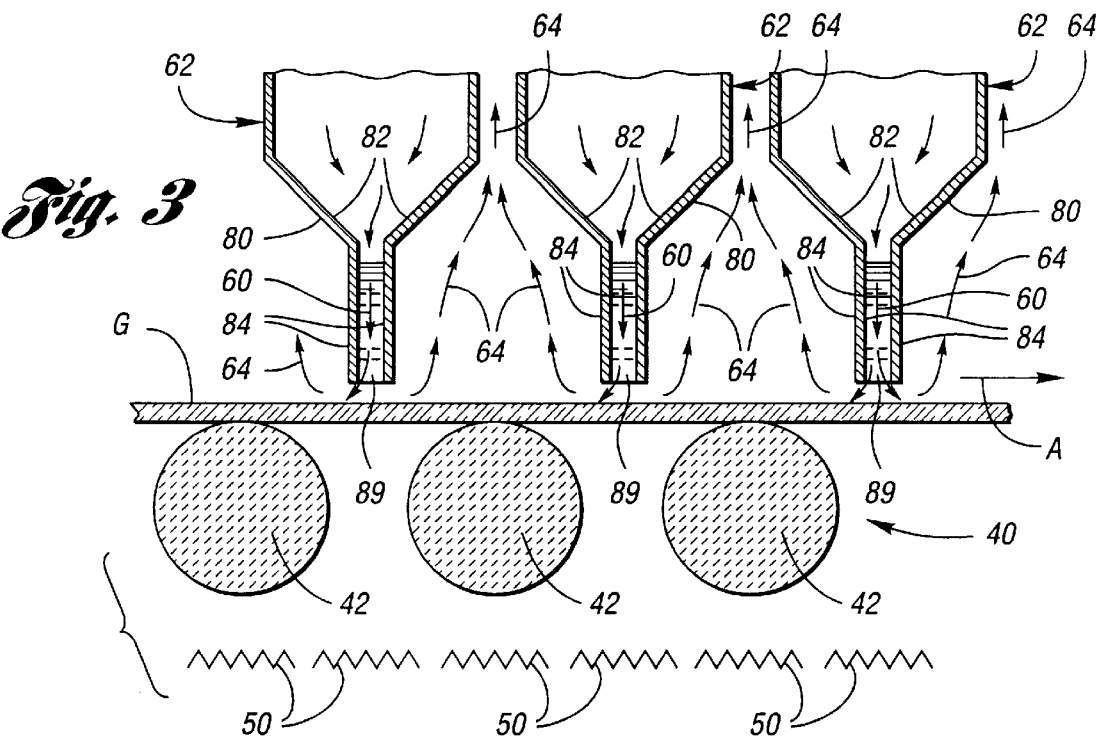
FIG. 3 is a partial sectional view taken along the direction of line 3—3 in FIG. 2 to illustrate the manner in which conveyed glass sheets are heated from below by radiant energy from electric resistance elements and from above by forced convection hot gas flow that is directed downwardly.

With continuing reference to FIGS. 1 and 2, the furnace 10 also includes a roll conveyor 40 having horizontally extending conveyor rolls 42 for supporting and conveying glass sheets G (FIG. 2) along a direction of conveyance that is identified by arrow A as illustrated in FIGS. 1 and 3. The conveyor rolls 42 have ends 44 that project outwardly through furnace side seals 46 and are rotatively driven by a continuous drive chain 47 to provide conveyor roll rotation and conveyance of the glass sheets within the heating chamber 18 of the furnace housing 12.

As illustrated in FIGS. 1 and 2, an electric resistance heater 48 of the furnace includes electric resistance elements 50 that are supported by the lower housing portion 14 below the rolls 42 of the conveyor 40 such that electrical power supplied thereto heats the conveyed glass sheets G from below. More specifically as illustrated in FIG. 2, the furnace floor 26 includes an upper floor member 52 that is cast from fused silica and includes T-shaped retainers 54 that receive the heating elements 50 which extend back and forth as illustrated in FIG. 1 between the adjacent pairs of retainers. The radiant upward heat from the resistance elements 50 not only shines between the conveyor rolls 42 directly onto the lower surface of the glass sheet G, but also as illustrated best in FIG. 3 also shines upwardly to the conveyor rolls 42 to provide radiant heating thereof which, in turn, heats the lower glass sheet surface primarily by radiation but also by conduction. The conveyor rolls 42 are preferably made from sinter bonded fused silica so as to have good resistance to thermal warpage.

As illustrated in FIGS. 1 and 2, the furnace 10 also includes a forced convection heater 56 that is supported by the upper housing portion 16 and for the most part located within the heating chamber 18 of the furnace housing. The forced convection heater includes gas burners 58 that are mounted by the furnace housing side wall 28 for heating a hot gas flow that, as illustrated by arrows 60 in FIG. 3, is directed downwardly to provide a dominant mode of external heat for heating the conveyed glass sheets G from above.

In describing the heating provided by the forced convection heater 56 as being a "dominant mode" of external heat for heating the conveyed glass sheets from above, it should be appreciated that there can be other amounts of minimal heat provided to the conveyed glass sheets from above such as, for example, heat provided by electromagnetic beams that shine into the upper housing portion for detecting glass sheet location, localized heaters that may be utilized to provide localized heating of the conveyed glass sheets at abrupt bend locations, or other heating that is minimal in comparison to the primary heating provided by the forced convection.

As illustrated in FIGS. 1 and 3, furnace 10 also includes hot gas distributors 62 that are spaced along the direction of conveyance to deliver the downward hot gas flow illustrated by arrows 60 in FIG. 3 and which permit the hot gas after impinging with the upper glass sheet surface to flow back upwardly as illustrated by arrows 64.

As shown in FIG. 2, each gas burner 58 is mounted on the furnace housing 12 at one lateral side thereof and has a nozzle end 66 located within the heating chamber 18 such that products of combustion thereof flow into the furnace to provide external heating as the forced convection previously described. Each burner 58 also has an associated mixing tube 68 mounted within the furnace heating chamber 18 by a mount 70 on the housing ceiling 30. The mixing tube 68 is open to the burner nozzle end 66 to receive the products of combustion and is also open to the heating chamber so as to receive return air as well. A plenum housing 72 of the forced convection heater 56 is associated with each burner 58 and its mixing tube 68 and is supported within the heating chamber 18 above the roll conveyor 40. This plenum housing 72 has an intake 74 that receives a hot gas flow of mixed return air and products of combustion from the gas burner 58 from the mixing tube 68 for flow to and through the hot gas distributors 62 downwardly to the conveyed glass sheets as previously described. The plenum housing 72 is located at another lateral side of the furnace housing 12 opposite the one lateral side thereof where the burner 58 is located, and a supply blower 76 is located within the plenum housing to pressurize the mixed return air and products of combustion received from the mixing tube 68 by the intake 74. More specifically, the intake 74 receives the mixed return air and products of combustion from the mixing tube 68 at one lateral side of the plenum housing 72 and extends internally through the plenum housing to deliver the hot gas flow to the supply blower 76 at another lateral extremity of the plenum housing. From the supply blower 76, the pressurized hot gas flow flows through openings 78 for flow to the hot gas distributors 62.

Figure 4:
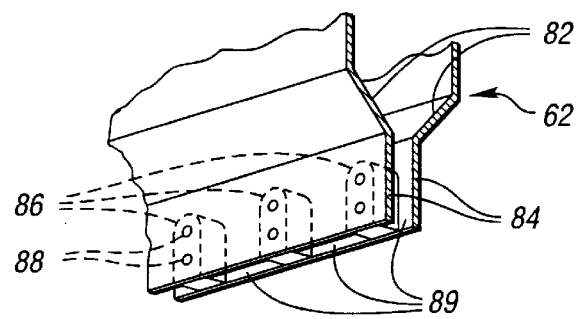
FIG. 4 is a perspective view illustrating the construction of hot gas distributors that provide the downwardly directed hot gas flow for performing the forced convection heating from above.

As illustrated in FIGS. 3 and 4, the hot gas distributors 62 each include lower converging ends 80 made of formed sheet metal pieces 82 that have parallel nozzle portions 84 between which nozzle spacers 86 are located and secured in any suitable manner such as by fasteners or welds 88 best shown in FIG. 4. The nozzle spacers 86 have curved upper ends that provide a converging entry into the downwardly extending nozzle passages 89 through which the hot gas flows downwardly to provide the forced convection as previously described.

All of the components of the forced convection heater described above are preferably made from high temperature sheet metal such as a stainless steel of a high chromium content.

As shown in FIGS. 1 and 2, a baffle 90 is mounted on the one furnace side wall 28 adjacent the open end of the mixing tube 68 and prevents excessive drawing of cold ambient air into the furnace heating chamber 18 around the roll seals 46 through which the conveyor roll ends 44 project outwardly for the rotational driving as previously described. Within the furnace heating chamber 18, there is a slight pressure above atmosphere that is prevented from being excessive by exhaust ducts 92 on the furnace housing ceiling 30 at spaced locations shown in FIG. 1 under the control of associated dampers 94.

The burners 58 as shown in FIG. 2 provide a level of heating under the operation of associated controls 96 that include associated thermocouples 98 for sensing the temperature of the pressurized hot gas flow in the plenum housings 72 after being pressurized by the supply blowers 76 and just prior to being distributed by the hot gas distributors 62. Also, the supply blowers 76 are each driven by a drive shaft 100 that is driven by an unshown electric motor located externally of the heated furnace housing 12 and operated by an associated control 102 that can be coupled with the burner controls 96 in any suitable manner to provide coordination of the burner and blower operations.

Figure 5:
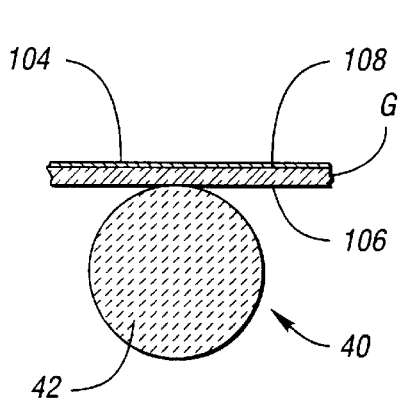
FIG. 5 is a sectional view taken in the same direction as FIG. 3 to illustrate the manner in which the heating can be performed on a glass sheet having a continuously coated surface such as a low emission coating that faces upwardly during the heating.

As illustrated in FIG. 5, the glass sheet G being heated can have a coating 104 such as of the low emission type of coating currently used on much architectural glass. Heating of this type of coated glass sheet for which the invention has particular utility is performed with a lower uncoated surface 106 of the glass sheet facing downwardly to be supported by the conveyor rolls 42 of the roll conveyor 40 and with the upper coated surface 108 thereof facing upwardly so as to be heated by the forced convection in the manner previously described.

Figure 6:
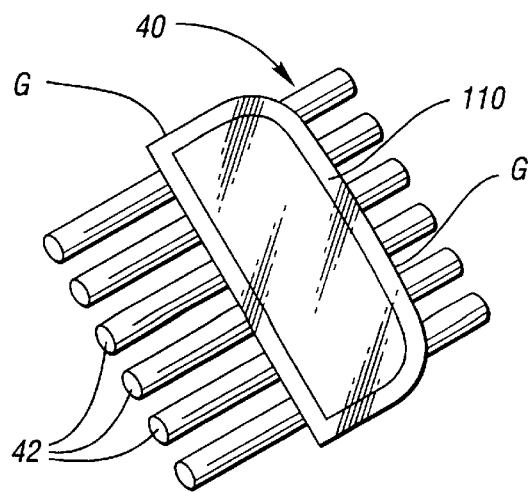
FIG. 6 is a perspective view that illustrates the manner in which a glass sheet is conveyed with a coated surface thereof facing upwardly as illustrated by the peripheral paint band.

As illustrated in FIG. 6, the upper coated surface of the glass sheet G can also be provided by a paint band 110 that covers less than the entirety of the glass sheet such as its periphery as illustrated.

Figure 7:
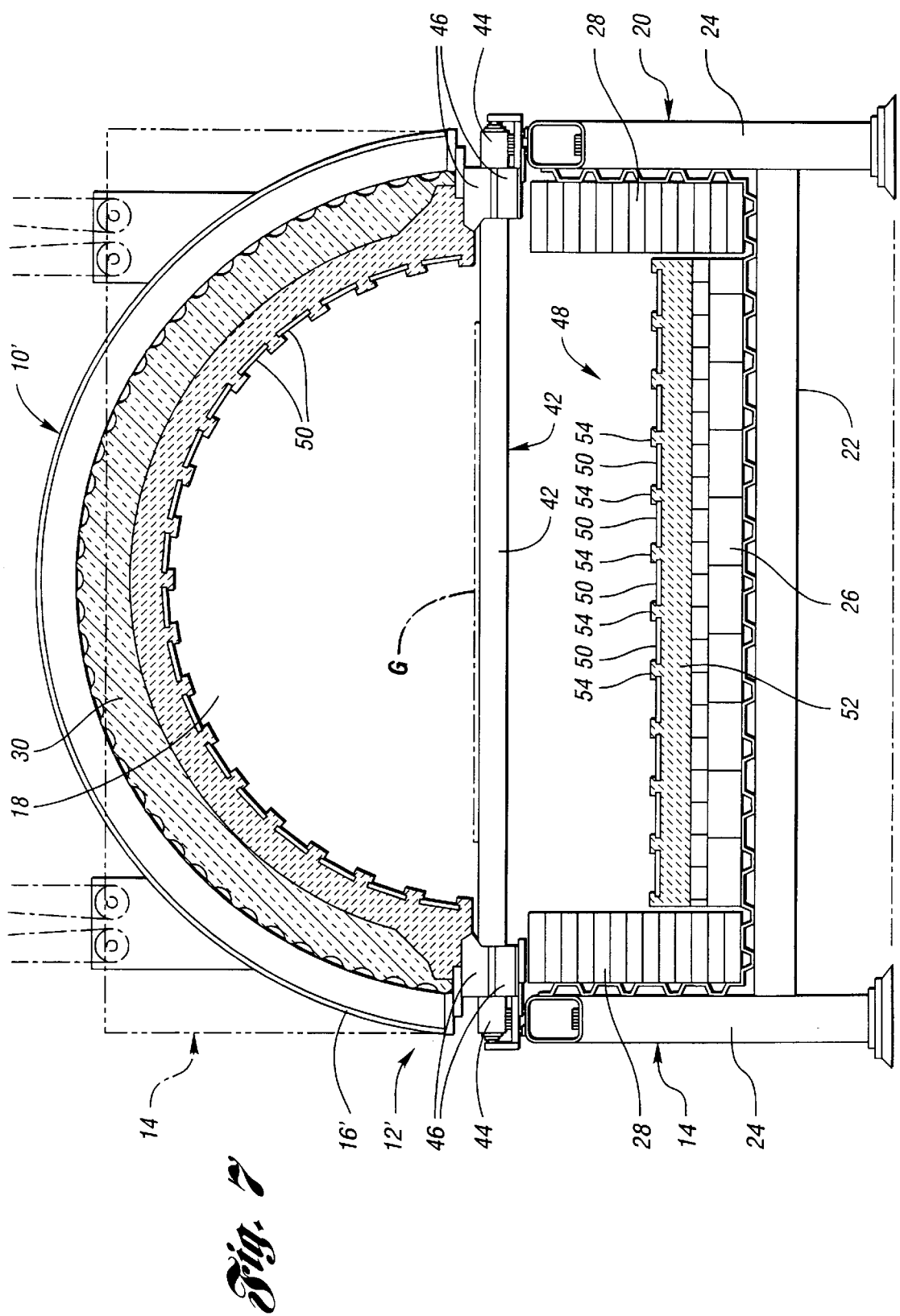
FIG. 7 is a cross sectional view illustrating the manner in which the furnace can be made by providing an electric resistance furnace having a lower portion and an upper portion that is illustrated by solid line representation prior to FIG. 8 is a sectional view taken in the same direction as FIG. 3 and illustrating another construction of the hot gas distributor.

With reference to FIG. 7, the furnace as previously described is provided by retrofitting a glass sheet roll conveyor furnace of the electric resistance type as generally indicated by 10'. This furnace has electric resistance elements 50 supported on a housing 12' of the furnace below and above a roll conveyor 40 thereof. Both the roll conveyor 40 and the lower housing portion 14 of the furnace are maintained and have the same construction as the furnace previously described in connection with FIGS. 1–6. A gas burner forced convection heater is installed within another upper housing portion to provide the dominant mode of external heat for heating the conveyed glass sheets from above in the same manner previously described such that the upper electric resistance elements 50 above the roll conveyor are no longer utilized for the heating. The upper housing portion 12' of the furnace 10' is removed and replaced with the new upper housing portion 14 that is installed and has the same construction as previously described and supports the gas burner forced convection heater above the roll conveyor with the same construction as the previously described gas burner forced convection heater.

With reference to FIGS. 8–10 and 11–13, further embodiments of the hot gas distributors 62a and 62b are illustrated. With each of these embodiments, the banks of nozzle passages 89 are laterally spaced from each other from one bank to the other in an alternating relationship transverse to the direction of conveyance. This construction of the nozzle banks provides uniformity of the heating provided by the hot gas to the upper surfaces of the glass sheets as they are conveyed for the heating.

Figure 8:
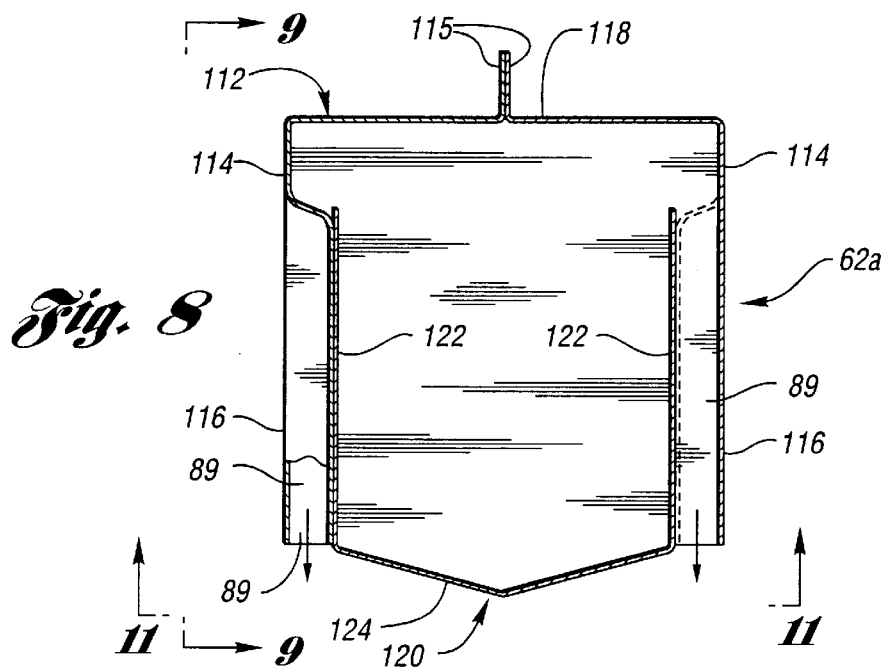
Figure 9:
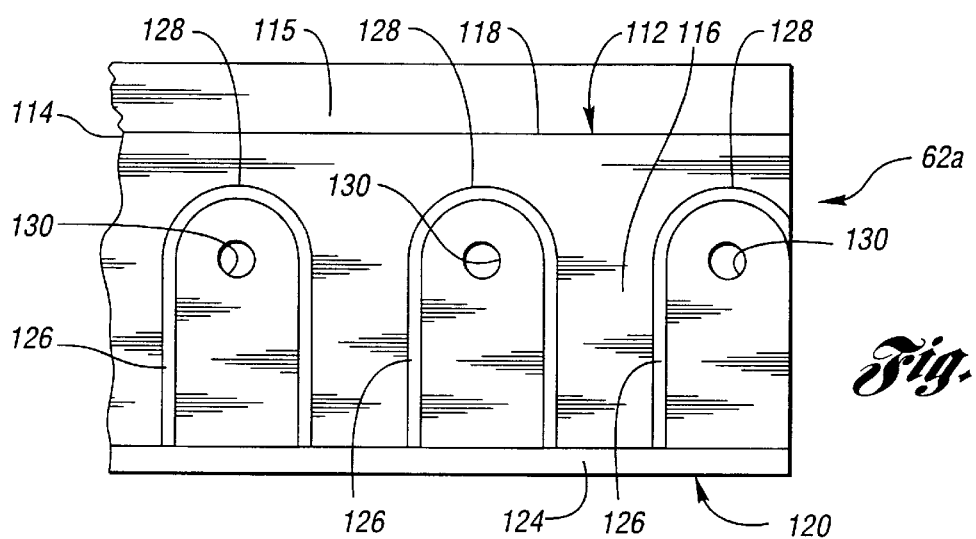
FIG. 9 is an elevational view taken along the direction of line 9—9 in FIG. 8 to further illustrate that construction of the hot gas distributor.
Figure 10:
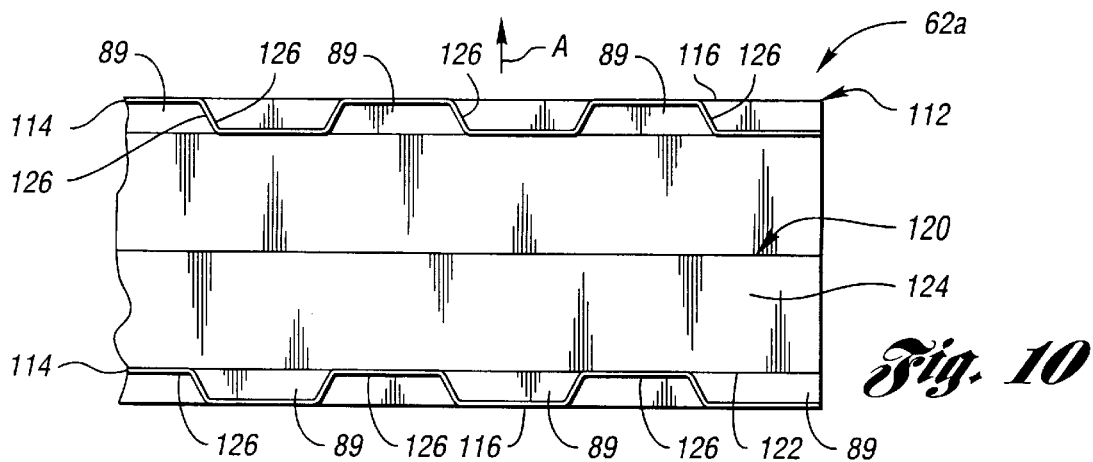
FIG. 10 is a bottom plan view taken along the direction of line 10—10 in FIG. 8 to further illustrate that construction of the hot gas distributor.

As illustrated in FIGS. 8–10, the hot gas distributor 62a includes an inverted U-shaped housing 112 having a pair of housing members 114 of inverted L shapes with upper flanges 115 that are secured to each other in any suitable manner such as by welding. The inverted U-shaped housing 112 provided by the inverted L-shaped housing members 114 includes a pair of spaced side portions 116 and a connecting portion 118 extending between its side portions. The hot gas distributor 62a also includes a U-shaped cap 120 received within the inverted U-shaped housing 112 thereof and having a pair of spaced side portions 122 and a cap portion 124 extending between its side portions. The spaced side portions 116 of the inverted U-shaped housing 112 and the spaced side portions 122 of the U-shaped cap 120 of the hot gas distributor 62a cooperate to define the pair of nozzle bank passages 89 through which the hot gas jets are delivered for the downward hot gas flow to the conveyed gas sheets being heated.

The construction of the lower hot gas distributors 62a illustrated in FIGS. 8–10 is made entirely from formed sheet metal. More specifically, the inverted U-shaped housing 112 is provided by the pair of formed sheet metal housing members 114 and the side portions 116 of the housing are formed to cooperate with the spaced side portions 122 of the U-shaped cap 120 to define the pair of banks of nozzle passages 89 of the hot gas distributor 62. This forming of the side portions 116 of the inverted U-shaped housing 112 is provided by inward formations 126 that are vertically elongated and have upper rounded ends 128 as shown in FIG. 9 such that the adjacent formations provide curved converging shapes at the entry end of each nozzle passage 89. Adjacent their ends 128, the formations 126 have round openings 130 that facilitate securement of the side portions 116 of the inverted U-shaped housing 112 to the side portions 122 of the U-shaped cap 120 such as by welding.

Figure 11:
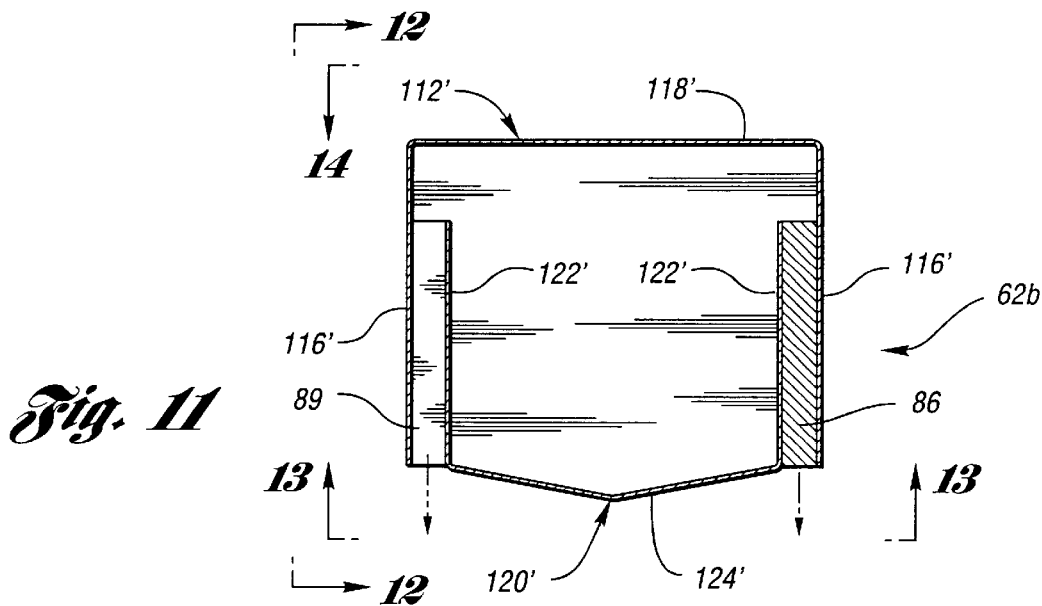
FIG. 11 is a sectional view taken in the same direction as FIG. 8 illustrating another construction of the hot gas distributor.
Figure 12:
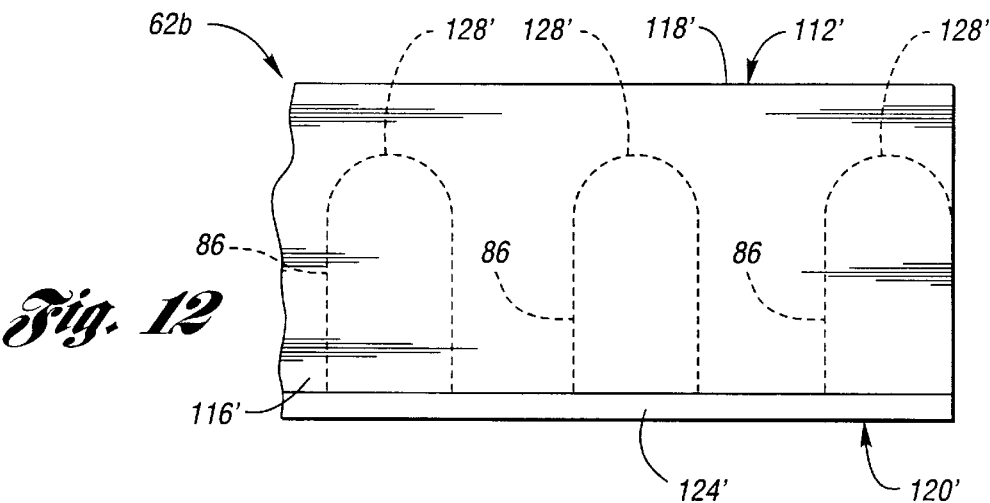
FIG. 12 is an elevational view taken along the direction of line 12—12 in FIG. 11 to further illustrate that construction of the hot gas distributor.
Figure 13:
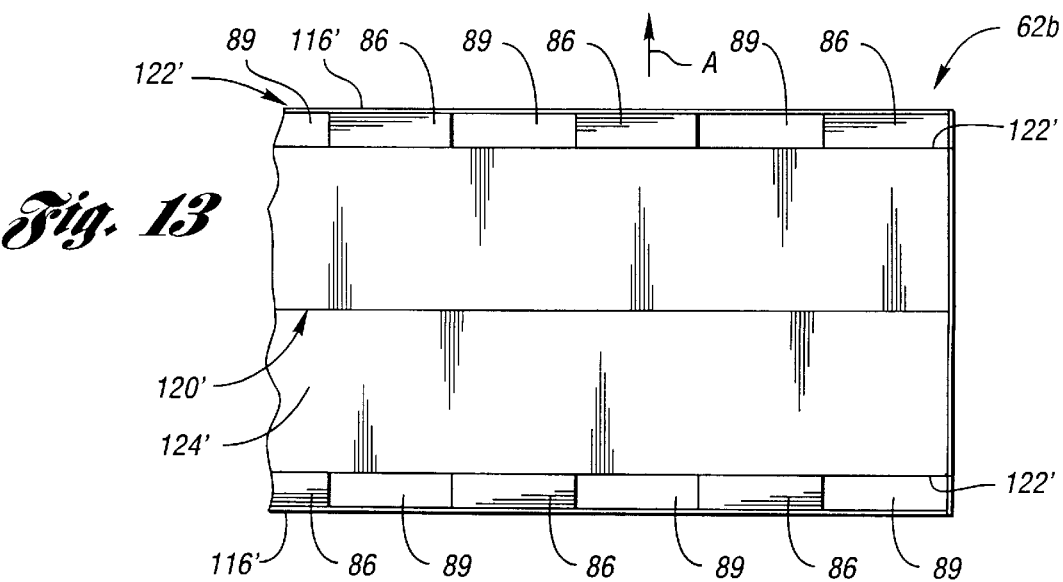
FIG. 13 is a bottom plan view taken along the direction of line 13—13 in FIG. 11 to further illustrate that construction of the hot gas distributor.

The construction of the hot gas distributor 62b illustrated in FIGS. 11–13 has an inverted U-shaped housing 112' whose side portions 116' and connecting portion 118' are unitary with each other in the same manner as the side portions 122' and cap portion 124' of the U-shaped cap 120'. However with this embodiment, nozzle spacers 86 located between the housing and cap side portions 116' and 122' cooperate therewith to define the pair of banks of nozzle passages 89 of the hot gas distributor. These nozzle spacers 86 have semicircular ends 128' that provide curved converging shapes at the entry ends of the nozzle passages 89.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for making a furnace for heating glass sheets, comprising:

providing a glass sheet roll conveyor furnace of the electric resistance heater type having a housing including lower and upper portions for respectively supporting lower and upper electric resistance elements below and above a roll conveyor including conveyor rolls within the furnace;

maintaining the roll conveyor and the lower housing portion of the furnace for supporting the lower electric resistance elements below the conveyor rolls such that electrical power supplied thereto provides heating from below of glass sheets conveyed by the conveyor rolls;

removing the upper housing portion of the furnace above the roll conveyor; and installing another upper housing portion and a gas burner forced convection heater supported thereon to provide a dominant mode of external heat for heating the conveyed glass sheets from above.

2. A method for making a furnace for heating glass sheets as in claim 1 wherein the gas burner forced convection heater is installed with hot gas distributors spaced along a direction of conveyance of the furnace.

3. A method for making a furnace for heating glass sheets as in claim 2 wherein the forced convection heater is also installed with the gas burner on one lateral side of the furnace, with a mixing tube that mixes return air and products of combustion, and with a plenum housing that is located at another lateral side of the furnace to receive the mixed return air and products of combustion from the mixing tube as a hot gas flow that is fed to the hot gas distributors.

4. A method for making a furnace for heating glass sheets as in claim 3 wherein the forced convection heater is also installed with the plenum housing having an intake that receives the mixed return air and products of combustion at one lateral side of the plenum housing, and with the plenum housing having a supply blower located therein at another lateral extremity of the plenum housing to provide pressurizing of the mixed return air and products of combustion as the hot gas flow.

5. A method for making a furnace for heating glass sheets, comprising:

providing a glass sheet roll conveyor furnace of the electric resistance heater type having a housing including lower and upper portions for respectively supporting lower and upper electric resistance elements below and above conveyor rolls within the furnace;

maintaining the roll conveyor and the lower housing portion of the furnace for supporting the lower electric resistance elements below the conveyor rolls such that electrical power supplied thereto provides heating from below of glass sheets conveyed by the conveyor rolls;

removing the upper housing portion of the furnace above the roll conveyor; and installing another upper housing portion and a gas burner forced convection heater supported thereon to provide a dominant mode of external heat for heating the conveyed glass sheets from above, and the forced convection heater being installed with the gas burner on one lateral side of the furnace, with a mixing tube that mixes return air and products of combustion from the gas burner, with a plenum housing that pressurizes the mixed return air and products of combustion as a hot gas flow, and with gas distributors that receive the hot gas flow from the plenum housing and feed the hot gas flow downwardly to the conveyed glass sheets.

6. A method for making a furnace for heating glass sheets, comprising:

providing a glass sheet roll conveyor furnace of the electric resistance heater type having a housing including lower and upper portions for respectively supporting lower and upper electric resistance elements below and above conveyor rolls within the furnace;

maintaining the roll conveyor and the lower housing portion of the furnace for supporting the lower electric resistance elements below the roll conveyor such that electrical power supplied thereto provides heating from below of glass sheets conveyed by the conveyor rolls; and removing the upper housing portion of the furnace above the roll conveyor; and installing another upper housing portion and a gas burner forced convection heater supported thereon to provide a dominant mode of external heat for heating the conveyed glass sheets from above, and the forced convection heater being installed with the gas burner on one lateral side of the furnace, with a mixing tube that mixes return air and products of combustion from the gas burner, with a plenum housing having an intake at one lateral side of the plenum housing for receiving and feeding the mixed return air and products of combustion internally through the hot plenum housing to a supply blower therein at another lateral extremity thereof for pressurizing as a hot gas flow, and with hot gas distributors that receive the hot gas flow from the plenum housing and feed the hot gas flow downwardly to the conveyed glass sheets.

* * * * *